I. H. RILEY.
WHEEL TIRE.
APPLICATION FILED FEB. 24, 1915.
1,143,139.
Patented June 15, 1915.
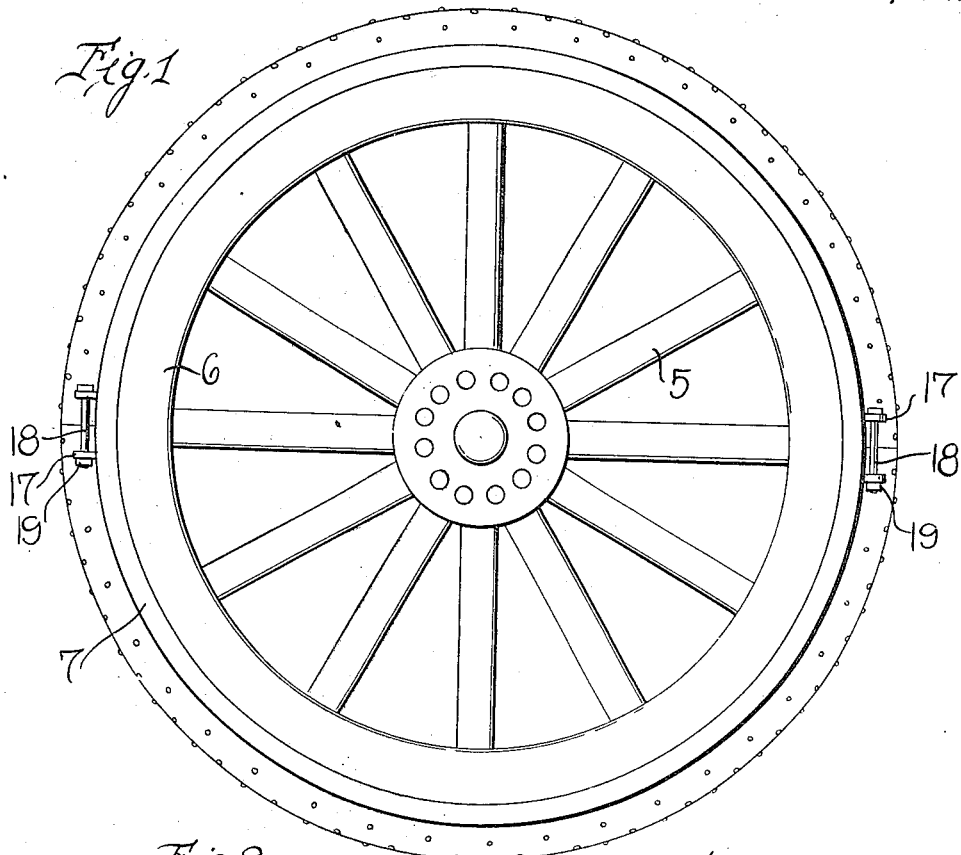
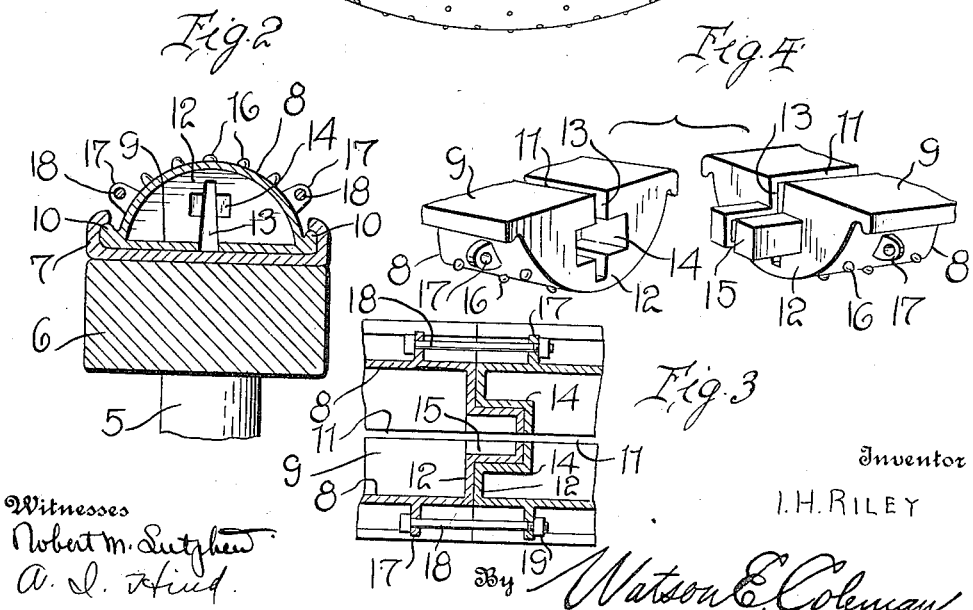
Witnesses
Robert M. Sutphen
A. I. Hind
Inventor
I. H. Riley
By Watson E. Coleman
Attorney

UNITED STATES PATENT OFFICE.

ISAAC H. RILEY, OF OSCEOLA, IOWA.

WHEEL-TIRE.

1,143,139. Specification of Letters Patent. Patented June 15, 1915.

Application filed February 24, 1915. Serial No. 10,260.

*To all whom it may concern:*

Be it known that I, ISAAC H. RILEY, a citizen of the United States, residing at Osceola, Iowa, in the county of Clarke and State of Iowa, have invented certain new and useful Improvements in Wheel-Tires, of which the following is a specification, reference being had to the accompanying drawings.

This invention relates to an improved wheel tire and has for its primary object to produce a simply constructed and durable tire for the wheels of automobiles and like vehicles which may be easily and quickly applied to or removed from the wheel rim.

The invention has for a more particular object to provide a metallic wheel tire embodying two hollow semi-circular sections provided with interlocking means on their abutting ends and additional means for positively connecting the sections together and holding the same in assembled relation upon the wheel rim.

With the above and other objects in view, my invention consists in the novel features of construction, combination, and arrangement of parts to be hereinafter more fully described, claimed, and illustrated in the accompanying drawing, in which, Figure 1 is a side elevation showing my improved metallic tire applied to a wheel; Fig. 2 is an enlarged transverse section; Fig. 3 is a longitudinal section through the abutting ends of the two tire sections; and Fig. 4 is a fragmentary perspective view showing the tire sections separated.

Referring in detail to the drawing, 5 designates the wheel provided with the usual rim 6. This rim may be of any ordinary or approved cross-sectional contour, and as illustrated, is provided with clenching flanges 7.

The improved tire, forming the subject matter of the present application, embodies two similar sections of semi-circular form. Each of these sections is hollow and includes a body wall indicated at 8, of substantially semi-circular contour in cross-section, and the base wall 9. The edges of the tire section, at the juncture of the body wall with the base wall, has a continuous longitudinal rib or bead 10 formed thereon. The base wall 9 of the tire section is longitudinally split, as at 11, and at each end of said wall, the same is integrally connected to the body wall 8 by means of an end wall 12, said end wall being also centrally split or divided, as at 13, said split in the end wall being a continuation of the longitudinal split 11 in the base wall 9. By constructing the metallic tire section in this manner, it is obvious that the opposed side portions thereof may be pressed or forced inwardly toward each other to decrease the distance between the longitudinal beads 10 and enable the metallic tire section to be properly fitted upon the wheel rim, whereby the beads may engage with the clenching flanges thereof.

One end wall of each tire section is provided with an integral socket, the socket consisting of two halves 14 formed upon the opposed edges of the wall 12 at the split therein. On the opposite end wall 12 of the tire section, a tenon is similarly formed, the tenon sections 15 being forced together when the sides of the tire section are compressed so that they will readily fit into the sectional socket 14 on the opposed end of the other tire section.

Upon the body wall 8 of each tire section, studs or projections 16 are formed, the studs upon the central or tread portion of the body wall being very short and successively increasing in length from the opposite sides of said wall. These projections effectually prevent skidding of the wheel. Upon the opposite sides of the body wall 8 of each section and at each end thereof, outwardly projecting perforated ears or lugs 17 are formed. Bolts 18 are adapted to be inserted through the openings in these ears, and nuts 19 are threaded upon said bolts for clamping engagement with the ears of one of the tire sections, whereby said sections are positively connected at their opposed ends and held against relative movement.

Having above described the several structural features of my improved tire, the manner of assembling the same upon the rim of a wheel will be readily understood. One of the metallic tire sections is first fitted upon a wheel rim by compressing the opposite side portions of said section, so that the beads 10 may be engaged under the clenching flanges of the rim. The other section is then disposed upon the opposite side of the rim, and the tenon sections 15 of the respective tire sections engaged in the sockets 14. When the pressure is released upon the latter tire section, the resiliency of the metal will cause the ends thereof to spread apart so that the rim sections will bind against the rim flanges. The bolts 18 are then inserted and the clamping nuts 19 threaded thereon, whereby the opposed ends of the tire sections will be drawn together and positively held in connected relation. It will thus be seen that I have produced a metallic tire which, while exceedingly simple in its construction, will also be highly durable and efficient in practical use. The tire may be easily and quickly applied to the rim of a wheel or removed therefrom. It is, of course, understood that the metallic sections may be constructed in various forms, and I do not desire to be limited to the particular cross-sectional shape of said sections, as illustrated in the drawings. The invention is also susceptible of many other modifications in its several structural features, and I, therefore, reserve the privilege of resorting to all such legitimate changes as may be fairly embodied within the spirit and scope of the appended claims.

Having thus fully described my invention, what I desire to claim and secure by Letters Patent is:—

1. A wheel tire including two hollow sheet metal sections each having a longitudinally split base wall and split end walls, whereby the opposite sides of the tire section may be compressed and fitted upon the rim of a wheel, and means for connecting the tire sections at their opposed ends and positively holding the same against relative movement.

2. A wheel tire including two hollow metallic sections each having a body wall and a base wall, and end walls integrally connecting the body wall and base walls at their opposite ends, said base wall and the end walls being longitudinally split whereby the opposite sides of the tire sections may be compressed and the same fitted upon a wheel rim, each of said tire sections being provided upon its split end walls with a mortise and tenon, respectively, and adapted for fitting engagement with the mortise and the tenon on the opposed ends of the other tire section.

3. A wheel tire including two hollow metallic sections each having a body wall and a base wall, end walls integrally connecting the body wall and base walls at their opposite ends, said base wall and the end walls being longitudinally split whereby the opposite sides of the tire sections may be compressed and the same fitted upon a wheel rim, each of said tire sections being provided upon its split end walls with a mortise and tenon, respectively, and adapted for fitting engagement with the mortise and the tenon on the opposed ends of the other tire section, and means for positively connecting said tire sections at their opposite ends and holding the same in assembled relation upon the wheel rim.

In testimony whereof I hereunto affix my signature in the presence of two witnesses.

ISAAC H. RILEY.

Witnesses:
A. F. WADE,
EVA PETRIE.

Copies of this patent may be obtained for five cents each, by addressing the "Commissioner of Patents, Washington, D. C."